US011689442B2

(12) United States Patent
Thubert et al.

(10) Patent No.: US 11,689,442 B2
(45) **Date of Patent: *Jun. 27, 2023**

(54) ROUTING IN FAT TREE NETWORKS USING NEGATIVE DISAGGREGATION ADVERTISEMENTS

(71) Applicant: Cisco Technology, Inc., San Jose, CA (US)

(72) Inventors: Pascal Thubert, La Colle sur Loup (FR); Eric Levy-Abegnoli, Valbonne (FR); Jakob Heitz, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,640

(22) Filed: Dec. 22, 2021

(65) Prior Publication Data

US 2022/0116306 A1 Apr. 14, 2022

Related U.S. Application Data

(63) Continuation of application No. 16/781,270, filed on Feb. 4, 2020, now Pat. No. 11,271,844, which is a (Continued)

(51) Int. Cl.
*H04L 45/02* (2022.01)

(52) U.S. Cl.
CPC .................................. *H04L 45/02* (2013.01)

(58) Field of Classification Search
CPC ..... H04L 45/00; H04L 45/021; H04L 45/023; H04L 45/025; H04L 45/128;

(Continued)

(56) References Cited

U.S. PATENT DOCUMENTS 6,314,434 B1 11/2001 Shigemi et al.
6,633,544 B1 10/2003 Rexford et al.

(Continued)

OTHER PUBLICATIONS

Z. Chen et al., Network Working Group, "Avoiding Traffic Black-Holes for Route Aggregation in IS-IS draft-chen-isis-black-hole-avoid-02", Mar. 5, 2018, 6 pages.

(Continued)

*Primary Examiner* — Kevin D Mew

(74) *Attorney, Agent, or Firm* — Edell, Shapiro & Finnan, LLC

(57) ABSTRACT

A particular fat tree network node stores default routing information indicating that the particular fat tree network node can reach a plurality of parent fat tree network nodes of the particular fat tree network node. The particular fat tree network node obtains, from a first parent fat tree network node of the plurality of parent fat tree network nodes, a negative disaggregation advertisement indicating that the first parent fat tree network node cannot reach a specific destination. The particular fat tree network node determines whether the first parent fat tree network node is the only parent fat tree network node of the plurality of parent fat tree network nodes that cannot reach the specific destination. If so, the particular fat tree network node installs supplemental routing information indicating that every parent fat tree network node except the first parent fat tree network node can reach the specific destination.

20 Claims, 12 Drawing Sheets

700

OBTAIN, FROM A FIRST PARENT FAT TREE NETWORK NODE OF THE PLURALITY OF PARENT FAT TREE NETWORK NODES, A NEGATIVE DISAGGREGATION ADVERTISEMENT INDICATING THAT THE FIRST PARENT FAT TREE NETWORK NODE CANNOT REACH A SPECIFIC DESTINATION (710)

DETERMINE WHETHER THE FIRST PARENT FAT TREE NETWORK NODE IS THE ONLY PARENT FAT TREE NETWORK NODE OF THE PLURALITY OF PARENT FAT TREE NETWORK NODES THAT CANNOT REACH THE SPECIFIC DESTINATION (720)

IF IT IS DETERMINED THAT THE FIRST PARENT FAT TREE NETWORK NODE IS THE ONLY PARENT FAT TREE NETWORK NODE OF THE PLURALITY OF PARENT FAT TREE NETWORK NODES THAT CANNOT REACH THE SPECIFIC DESTINATION, INSTALL SUPPLEMENTAL ROUTING INFORMATION INDICATING THAT EVERY PARENT FAT TREE NETWORK NODE EXCEPT THE FIRST PARENT FAT TREE NETWORK NODE CAN REACH THE SPECIFIC DESTINATION (730)

Related U.S. Application Data continuation of application No. 16/160,481, filed on Oct. 15, 2018, now Pat. No. 10,608,921.

(60) Provisional application No. 62/659,922, filed on Apr. 19, 2018.

(58) Field of Classification Search
CPC . H04L 45/1283; H04L 45/1287; H04L 45/26; H04L 45/54; H04L 45/70
See application file for complete search history.

(56) References Cited

U.S. PATENT DOCUMENTS 7,016,351 B1 * 3/2006 Farinacci ................ H04L 45/16 370/312
9,008,079 B2 4/2015 Davis et al.
9,008,092 B2 4/2015 Thubert et al.
9,036,509 B1 5/2015 Addepalli et al.
2002/0012320 A1 * 1/2002 Ogier .................... H04L 61/251 709/239
2003/0117966 A1 * 6/2003 Chen ....................... H04L 45/26 370/386
2004/0088392 A1 5/2004 Barrett
2008/0317012 A1 12/2008 Singh
2010/0074140 A1 3/2010 Markham
2010/0165886 A1 7/2010 Borill
2012/0117268 A1 * 5/2012 Shaffer .................. H04W 4/38 709/238
2012/0155389 A1 6/2012 McNamee et al.
2013/0039169 A1 2/2013 Schlansker et al.
2014/0029610 A1 * 1/2014 Vasseur ................. H04L 45/025 370/389
2016/0026542 A1 * 1/2016 Vasseur ............... H04L 67/1095 714/4.11
2016/0301565 A1 10/2016 Zahid et al.
2018/0367388 A1 12/2018 Pani et al.
2018/0367449 A1 12/2018 Pani et al.

OTHER PUBLICATIONS

N. Shen et al., Network Working Group, “IS-IS Routing for Spine-Leaf Topology draft-shen-isis-spine-leaf-ext-05”, Jan. 2, 2018, 17 pages.

T. Przygienda, Ed. et al., RIFT Working Group, “RIFT: Routing in Fat Trees draft-przygienda-rift-05”, Mar. 1, 2018, 67 pages.

P. Lapukhov et al., Internet Engineering Task Force (IETF), “Use of BGP for Routing in Large-Scale Data Centers”, Aug. 2016, 35 pages.

T. Przygienda, Ed. et al., “RIFT: Routing in Fat Trees”, draft-przygienda-rift-05, Mar. 1, 2018, 68 pages.

International Search Report and Written Opinion in counterpart International Application No. PCT/US2019/026908, dated Jul. 3, 2019, 15 pages.

* cited by examiner

ROUTING IN FAT TREE NETWORKS USING NEGATIVE DISAGGREGATION ADVERTISEMENTS

CROSS REFERENCE TO RELATED APPLICATION

This application is a continuation of U.S. application Ser. No. 16/781,270, filed Feb. 4, 2020, which is a continuation of U.S. application Ser. No. 16/160,481, filed Oct. 15, 2018, now U.S. Pat. No. 10,608,921, issued Mar. 31, 2020, which claims the benefit of U.S. Provisional Application No. 62/659,922, filed Apr. 19, 2018. The entirety of each of these applications is incorporated herein by reference.

TECHNICAL FIELD

The present disclosure relates to fat tree networks.

BACKGROUND

Some networks are arranged hierarchically in a tree data structure, meaning that network nodes are connected hierarchically by data links (or "branches"). In a fat tree network, different branches are capable of supporting different bandwidths. Some branches are thus "fatter" than others. Typically, branches near the top of the hierarchy are fatter than branches near the bottom of the hierarchy. The bandwidth-varied nature of fat tree networks enables efficient communication in technology-specific use cases.

DESCRIPTION OF EXAMPLE EMBODIMENTS

Overview

In one example embodiment, a particular fat tree network node stores default routing information indicating that the particular fat tree network node can reach a plurality of parent fat tree network nodes of the particular fat tree network node. The particular fat tree network node obtains, from a first parent fat tree network node of the plurality of parent fat tree network nodes, a negative disaggregation advertisement indicating that the first parent fat tree network node cannot reach a specific destination. The particular fat tree network node determines whether the first parent fat tree network node is the only parent fat tree network node of the plurality of parent fat tree network nodes that cannot reach the specific destination. If so, the particular fat tree network node installs supplemental routing information indicating that every parent fat tree network node except the first parent fat tree network node can reach the specific destination.

Example Embodiments

Figure 1:
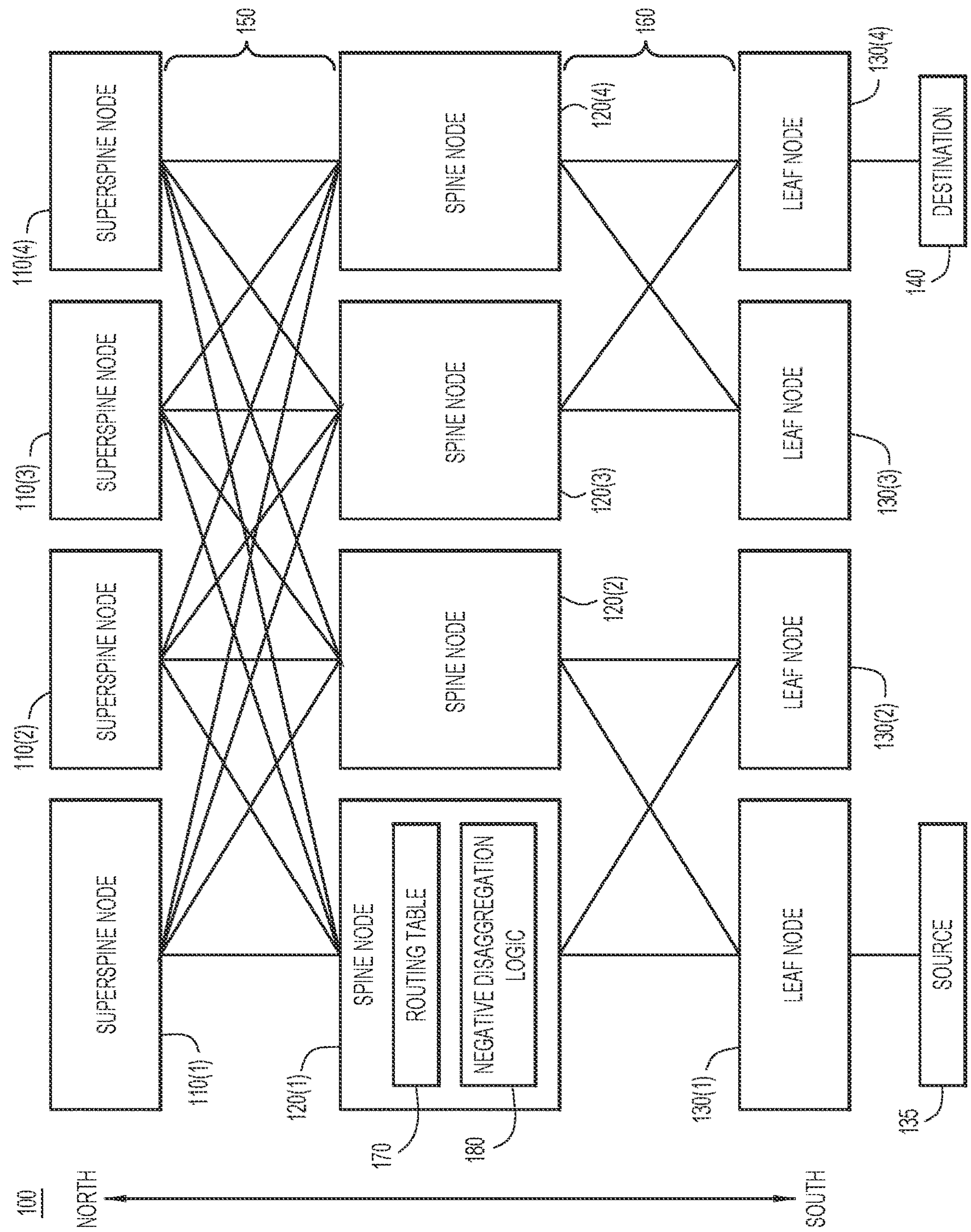
FIG. 1 illustrates a fat tree network configured to route packets using negative disaggregation advertisements, according to an example embodiment.

FIG. 1 illustrates fat tree network 100 configured to route packets using negative disaggregation advertisements. Fat tree network 100 includes superspine nodes 110(1)-110(4), spine nodes 120(1)-120(4), leaf nodes 130(1)-130(4), source (e.g., server) 135, and destination (e.g., prefix) 140. Links 150 connect each of superspine nodes 110(1)-110(4) to each of spine nodes 120(1)-120(4). Links 160 connect each of spine nodes 120(1) and 120(2) to each of leaf nodes 130(1) and 130(2), and each of spine nodes 120(3) and 120(4) to each of leaf nodes 130(3) and 130(4). Links 150 may support higher bandwidths than links 160. In one example, source 135 is configured to send one or more network packets to one or more destinations (e.g., destination 140) via fat tree network 100.

Initially, default advertisements are flooded south from superspine nodes 110(1)-110(4) to leaf node 130(1)-130(4). The default advertisements indicate which nodes are feasible northbound successors for other nodes. Thus, the default advertisements indicate that each of spine nodes 120(1)-120(4) can reach each of their parent superspine nodes 110(1)-110(4), each of leaf nodes 130(1) and 130(2) can reach each of their parent spine nodes 120(1) and 120(2), and each of leaf nodes 130(3) and 130(4) can reach each of their parent spine nodes 120(3) and 120(4).

Spine node 120(1) includes routing table 170, which stores routing information such as default routing information based on the default advertisements. Thus, spine node 120(1) is aware that each of superspine nodes 110(1)-110(4) are parent nodes for spine node 120(1). For ease of illustration, only routing table 170 is shown in spine node 120(1). However, it will be appreciated that each node in fat tree network 100 may include a respective local routing table to store routing information, such as the default routing information.

Subsequently, the link connecting superspine node 110(1) and spine node 120(4) goes down. The link connecting spine node 120(3) and leaf node 130(4) also goes down. The result is that superspine node 110(1) can no longer reach destination 140. This is contrary to the default routing information, which indicates that superspine node 110(1) can reach leaf node 130(4) (and therefore destination 140). After the aforementioned links go down, advertisements are flooded north from destination 140 to superspine nodes 110(1)-110(4). The advertisements indicate which nodes (e.g., spine node 120(4) and superspine nodes 110(2)-110(4)) can reach destination 140.

Superspine node 110(1) may determine that the default routing information is no longer accurate based on the process of south reflection. For example, superspine nodes 110(1) and 110(3) may exchange node-related information via reflection over one or more common children nodes (e.g., spine nodes 120(1)-120(3)). This enables superspine node 110(3) to discover that the link between superspine node 110(1) and spine node 120(4) is down. Because the link between superspine node 110(1) and spine node 120(4) was the only way for superspine node 110(1) to reach leaf node

130(4), superspine node 110(3) determines that superspine node 110(1) cannot reach leaf node 130(4) (or destination 140). Superspine node 110(3) may provide an indication to superspine node 110(1) that superspine node 110(1) cannot reach destination 140.

It will be appreciated that south reflection is just one method by which superspine node 110(1) may determine that the default routing information is no longer accurate. In fact, superspine node 110(1) may employ any suitable method to discover that superspine node 110(1) cannot reach destination 140. For example, one or more common children nodes (e.g., spine nodes 120(1)-120(3)) may reflect the non-transitive flooding of Southbound Topology Information Elements (S-TIEs). The Flooding Repeater (FR) technique may also/alternatively be leveraged.

Conventionally, once it has been established that superspine node 110(1) cannot reach destination 140, superspine nodes 110(2)-110(4) would flood advertisements south indicating that superspine nodes 110(2)-110(4) can reach destination 140. These advertisements would prevent spine nodes 120(1)-120(4) from sending network packets destined for destination 140 to superspine node 110(1), which would “black hole” those network packets. However, this would require a total of twelve advertisements (one from each of superspine nodes 110(2)-110(4) to each of spine nodes 120(1)-120(4)). This would create vast amounts of flooding in fat tree network 100, thereby negatively impacting fat tree network performance.

Accordingly, spine node 120(1) includes negative disaggregation logic 180, which causes spine node 120(1) to perform operations to reduce such flooding in fat tree network 100. For ease of illustration, negative disaggregation logic 180 is shown only in spine node 120(1). However, it will be appreciated that each node in fat tree network 100 may include respective negative disaggregation logic. The negative disaggregation logic may be identical or modified depending on the given node on which the negative disaggregation logic is stored. For example, the negative disaggregation logic stored on two spine nodes may be identical, but the negative disaggregation logic stored on a spine node and a superspine node may differ.

Briefly, superspine node 110(1) sends, to each of its children (e.g., spine nodes 120(1)-120(3)), a negative disaggregation advertisement indicating that superspine node 110(1) cannot reach destination 140. The negative disaggregation advertisement may be, for example, a distance vector and/or link-state advertisement. Notably, only three advertisements (one from superspine node 110(1) to each of spine nodes 120(1)-120(3)) are sent instead of twelve (from each of superspine nodes 110(2)-110(4) to each of spine nodes 120(1)-120(4)). This reduces flooding in fat tree network 100, particularly at larger scales (although the benefits are appreciable even at smaller scales). Thus, fat tree network performance is improved (e.g., decreased bandwidth consumption, decreased latency, increased speed of convergence in the control plane, etc.).

Spine node 120(1) obtains the negative disaggregation advertisement from superspine node 110(1) and determines whether superspine node 110(1) is the only parent fat tree network node of superspine nodes 110(1)-110(4) that cannot reach destination 140. In this example, because spine node 120(1) has only received the negative disaggregation advertisement from superspine node 110(1), spine node 120(1) determines that superspine node 110(1) is the only parent fat tree network node of superspine nodes 110(1)-110(4) that cannot reach destination 140. In response, spine node 120(1) installs supplemental routing information (e.g., in routing table 170) indicating that every parent fat tree network node except superspine node 110(1) can reach destination 140. The supplemental routing information may indicate, for example, that superspine nodes 110(2)-110(4) can all reach destination 140.

Thus, routing table 170 now includes both default routing information and supplemental routing information. The default routing information indicates that superspine node 110(1) is a feasible northbound successor for spine node 120(1), but the supplemental routing information indicates that superspine node 110(1) cannot reach destination 140. Consider a network packet that travels from source 135 to leaf node 130(1), and then to spine node 120(1). Spine node 120(1) obtains the network packet and determines the network packet destination. If the network packet is destined for a destination connected to leaf node 130(3), for example, spine node 120(1) may route the network packet to the destination based on the default routing information. For instance, spine node 120(1) may forward the network packet to any of its parent nodes, including superspine node 110(1), in accordance with the default routing information. However, if the network packet is destined for destination 140, spine node 120(1) may route the network packet to destination 140 based on the supplemental information. For example, spine node 120(1) may forward the network packet to any of superspine nodes 110(2)-110(4), but not superspine node 110(1), in accordance with the supplemental routing information.

Subsequently, the link between superspine node 110(2) and spine node 120(4) also goes down. As a result, superspine node 110(2) determines that it can no longer reach destination 140 and sends, to each of its children (e.g., spine nodes 120(1)-120(3)), a negative disaggregation advertisement indicating that superspine node 110(2) cannot reach destination 140. Spine node 120(1), for example, obtains the negative disaggregation advertisement from superspine node 110(2) and determines whether superspine node 110(2) is the only parent fat tree network node of superspine nodes 110(1)-110(4) that cannot reach destination 140.

This time, because spine node 120(1) has previously received a negative disaggregation advertisement from superspine node 110(1), spine node 120(1) determines that superspine node 110(2) is not the only parent fat tree network node of superspine nodes 110(1)-110(4) that cannot reach destination 140. In response, spine node 120(1) locates previously installed supplemental routing information indicating that superspine node 110(2) can reach the specific destination and removes the previously installed supplemental routing information. Here, the previously installed supplemental routing information was installed in response to spine node 120(1) receiving the negative advertisement from superspine node 110(1). Accordingly, the supplemental routing information stored in routing table 170 now indicates that superspine nodes 110(3) and 110(4) can reach destination 140.

Subsequently, the link between superspine node 110(3) and spine node 120(4) also goes down, and superspine node 110(3) sends, to each of its children (e.g., spine nodes 120(1)-120(3)), a negative disaggregation advertisement indicating that superspine node 110(3) cannot reach destination 140. Spine node 120(1), for example, obtains the negative disaggregation advertisement from superspine node 110(3) and determines whether superspine node 110(3) is the only parent fat tree network node of superspine nodes 110(1)-110(4) that cannot reach destination 140.

Because spine node 120(1) previously received a negative disaggregation advertisement from superspine node 110(1)

(and superspine node 110(2)), spine node 120(1) determines that superspine node 110(3) is not the only parent fat tree network node of superspine nodes 110(1)-110(4) that cannot reach destination 140. In response, spine node 120(1) locates previously installed supplemental routing information indicating that superspine node 110(3) can reach the specific destination and removes that routing information. Accordingly, the supplemental routing information stored in routing table 170 now indicates that only superspine node 110(4) can reach destination 140.

Subsequently, the link between superspine node 110(4) and spine node 120(4) also goes down, and superspine node 110(3) sends, to each of its children (e.g., spine nodes 120(1)-120(3)), a negative disaggregation advertisement indicating that superspine node 110(4) cannot reach destination 140. Spine node 120(1), for example, obtains the negative disaggregation advertisement from superspine node 110(4) and determines whether superspine node 110(4) is the only parent fat tree network node of superspine nodes 110(1)-110(4) that cannot reach destination 140. Because spine node 120(1) previously received a negative disaggregation advertisement from superspine node 110(1) (and superspine nodes 110(2) and 110(3)), spine node 120(1) determines that superspine node 110(4) is not the only parent fat tree network node of superspine nodes 110(1)-110(4) that cannot reach destination 140.

Moreover, spine node 120(1) determines that none of superspine nodes 110(1)-110(4) can reach the specific destination because spine node 120(1) has received negative disaggregation advertisements from each of superspine nodes 110(1)-110(4). In response, spine node 120(1) provides, to at least one of its children nodes (e.g., leaf nodes 130(1) and 130(2)), a negative disaggregation advertisement indicating that spine node 120(1) cannot reach destination 140. The negative disaggregation advertisement may prompt leaf node 130(1), for example, to install supplemental routing information in its routing table (not shown) in a similar manner to that described in relation to spine node 120(1). Thus, the routing table in leaf node 130(1) now includes both default routing information and supplemental routing information. The default routing information indicates that spine node 120(1) is a feasible northbound successor for leaf node 130(1), but the supplemental routing information indicates that spine node 120(1) cannot reach destination 140.

Consider, for example, a network packet that travels from source 135 to leaf node 130(1). Leaf node 130(1) obtains the network packet and determines the network packet destination. If the network packet is destined for a destination connected to leaf node 130(3), for example, leaf node 130(1) may route the network packet to the destination based on the default routing information. For instance, leaf node 130(1) may forward the network packet to any of its parent nodes, including spine node 120(1), in accordance with the default routing information. However, if the network packet is destined for destination 140, leaf node 130(1) may route the network packet to destination 140 based on the supplemental information. For example, leaf node 130(1) may forward the network packet to spine node 120(2), but not to spine node 120(1), in accordance with the supplemental routing information.

Subsequently, the link between superspine node 110(4) and spine node 120(4) comes back up. In response, superspine node 110(4) sends, to one or more of its children nodes (e.g., spine nodes 120(1)-120(3)), a reachability advertisement indicating that superspine node 110(4) can reach destination 140. Spine node 120(1), for example, obtains the reachability advertisement and installs supplemental routing information indicating that superspine node 110(4) can reach destination 140.

Spine node 120(1) may further determine whether superspine node 110(4) is the only parent fat tree network node of superspine nodes 110(1)-110(4) that can reach destination 140. In this example, because spine node 120(1) has only received the reachability advertisement from superspine node 110(1), spine node 120(1) determines that superspine node 110(1) is the only parent fat tree network node of superspine nodes 110(1)-110(4) that can reach destination 140. In response, spine node 120(1) provides, to at least one of its children nodes (e.g., leaf nodes 130(1) and 130(2)), a reachability advertisement indicating that spine node 120(1) can reach destination 140. The reachability advertisement may prompt leaf node 130(1), for example, to update its routing table (not shown) to indicate that spine node 120(1) can reach destination 140. Thus, when leaf node 130(1) obtains a network packet destined for destination 140, leaf node 130(1) may route the network packet to destination 140 by sending the network packet to spine node 120(1).

Subsequently, the link between superspine node 110(3) and spine node 120(4) comes back up. In response, superspine node 110(3) sends, to one or more of its children nodes (e.g., spine nodes 120(1)-120(3)), a reachability advertisement indicating that superspine node 110(3) can reach destination 140. Spine node 120(1), for example, obtains the reachability advertisement and installs supplemental routing information indicating that superspine node 110(3) can reach destination 140.

Spine node 120(1) may further determine whether superspine node 110(3) is the only parent fat tree network node of superspine nodes 110(1)-110(4) that can reach destination 140. In this example, because spine node 120(1) has already received the reachability advertisement from superspine node 110(4), spine node 120(1) determines that superspine node 110(3) is not the only parent fat tree network node of superspine nodes 110(1)-110(4) that can reach destination 140.

Subsequently, the link between superspine node 110(2) and spine node 120(4) comes back up. In response, superspine node 110(2) sends, to one or more of its children nodes (e.g., spine nodes 120(1)-120(3)), a reachability advertisement indicating that superspine node 110(2) can reach destination 140. Spine node 120(1), for example, obtains the reachability advertisement and installs supplemental routing information indicating that superspine node 110(2) can reach destination 140.

Spine node 120(1) may further determine whether superspine node 110(2) is the only parent fat tree network node of superspine nodes 110(1)-110(4) that can reach destination 140. In this example, because spine node 120(1) has already received the reachability advertisement from superspine node 110(4) (and superspine node 110(3)), spine node 120(1) determines that superspine node 110(2) is not the only parent fat tree network node of superspine nodes 110(1)-110(4) that can reach destination 140.

Subsequently, the link between superspine node 110(1) and spine node 120(4) comes back up. In response, superspine node 110(1) sends, to one or more of its children nodes (e.g., spine nodes 120(1)-120(3)), a reachability advertisement indicating that superspine node 110(1) can reach destination 140. Spine node 120(1), for example, obtains the reachability advertisement and installs supplemental routing information indicating that superspine node 110(1) can reach destination 140.

Spine node 120(1) may further determine whether superspine node 110(1) is the only parent fat tree network node of superspine nodes 110(1)-110(4) that can reach destination 140. In this example, because spine node 120(1) has already received the reachability advertisement from superspine node 110(4) (and superspine nodes 110(3) and 110(2)), spine node 120(1) determines that superspine node 110(1) is not the only parent fat tree network node of superspine nodes 110(1)-110(4) that can reach destination 140.

Moreover, spine node 120(1) may determine that each of superspine nodes 110(1)-110(4) can reach destination 140. This indicates to spine node 120(1) that the supplemental routing information is redundant to the default routing information. That is, the supplemental routing information offers no new information relative to the default routing information in terms of how to route network packets to destination 140. Since the links between spine node 120(4) and superspine nodes 110(1)-110(4) are back up, spine node 120(1) may route packets to destination 140 based on the default routing information. As such, spine node 120(1) may remove the supplemental routing information indicating that superspine nodes 110(1)-110(4) can reach destination 140.

Figure 2:
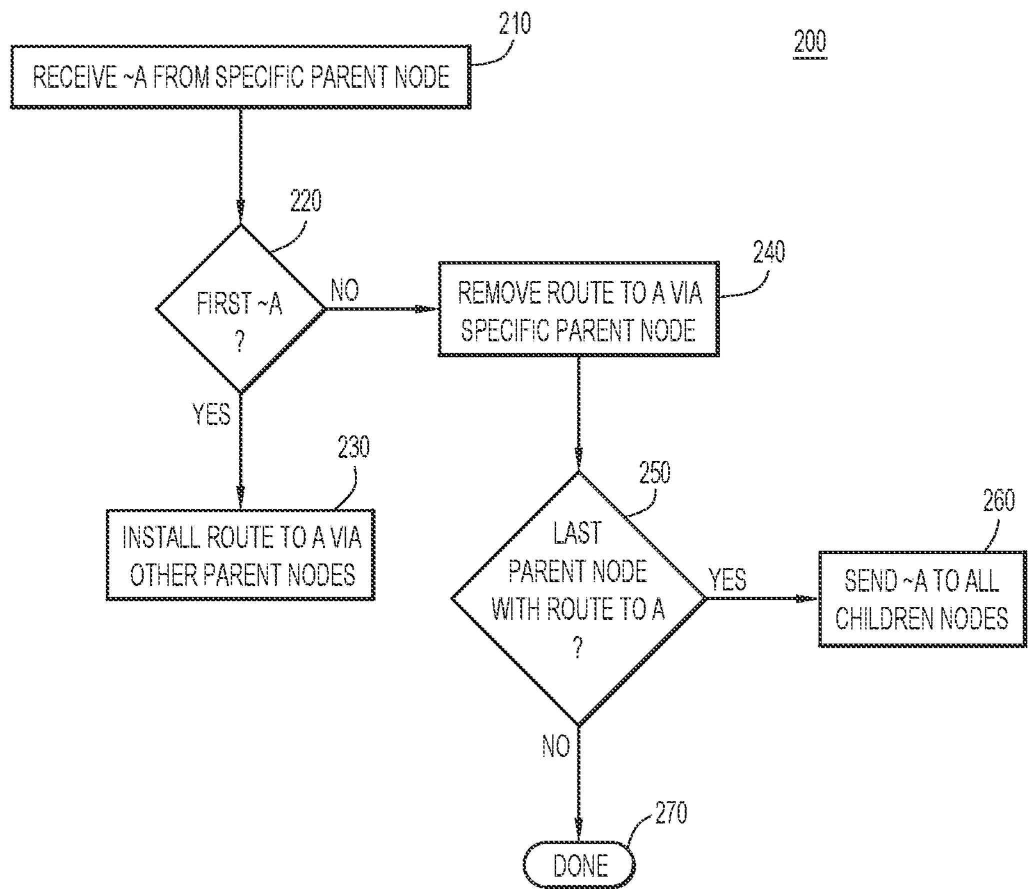
FIG. 2 illustrates a flowchart of a method for routing in a fat tree network upon receiving a negative disaggregation advertisement, according to an example embodiment.

FIG. 2 illustrates a flowchart of a method 200 for routing in a fat tree network upon receiving a negative disaggregation advertisement. In one example, method 200 is performed at spine node 120(1). At 210, spine node 120(1) receives a negative disaggregation advertisement for destination A (denoted as "~A") from a specific parent node. At 220, spine node 120(1) determines whether the negative disaggregation advertisement is the first negative disaggregation advertisement received from any of its parent nodes. If so, at 230 spine node 120(1) installs a route to destination A via other parent nodes. This may include all parent nodes except for the specific parent node, and/or all parent nodes that advertise towards the longest aggregation of destination A.

If the negative disaggregation advertisement is not the first negative disaggregation advertisement received from any of its parent nodes, at 240 spine node 120(1) removes a (previously installed) route to destination A via the specific parent node. At 250, spine node 120(1) determines whether the specific parent is the last parent node with an installed route to destination A. If so, at 260 spine node 120(1) sends a negative disaggregation advertisement for destination A to all of its children nodes. Otherwise, at 270, method 200 is done.

Figure 3:
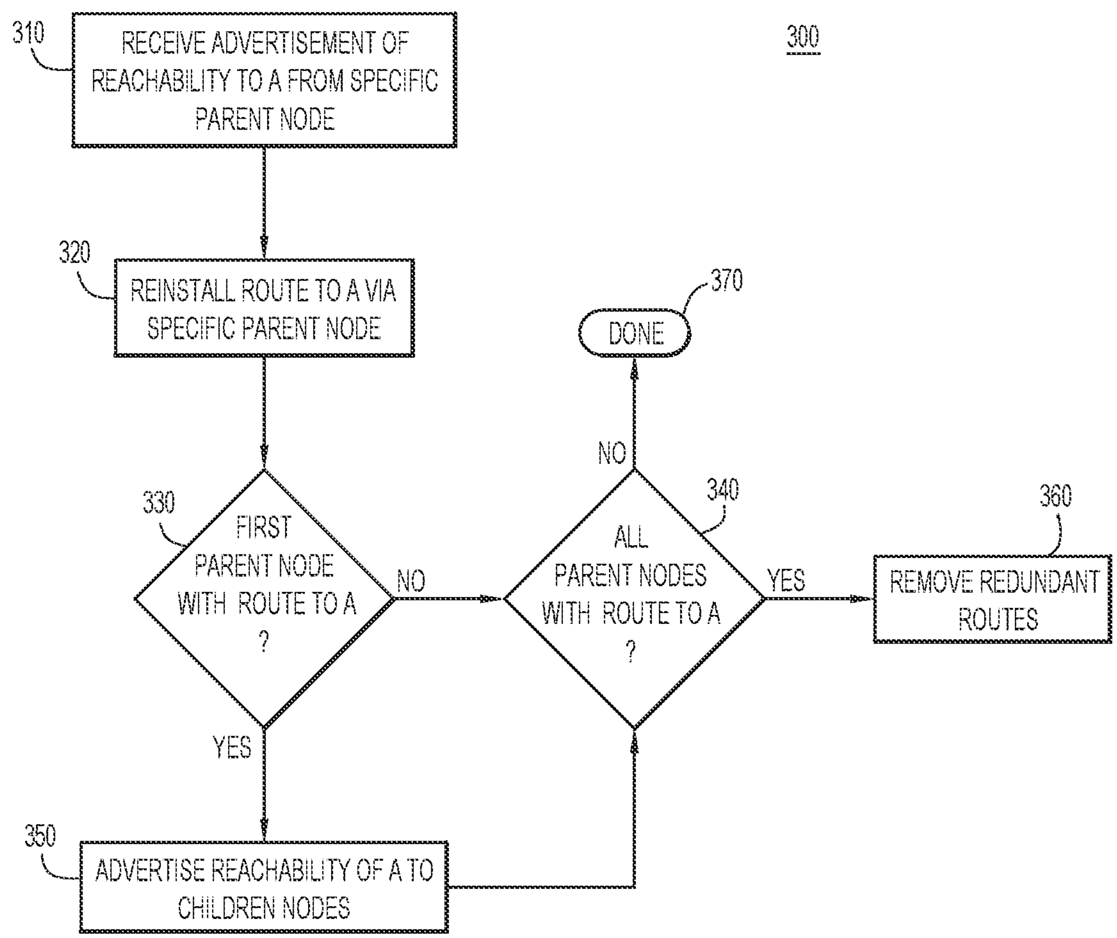
FIG. 3 illustrates a flowchart of a method for routing in a fat tree network upon receiving a reachability advertisement, according to an example embodiment.

FIG. 3 illustrates a flowchart of a method 300 for routing in a fat tree network upon receiving a reachability advertisement. In one example, method 300 is performed at spine node 120(1) sometime after method 200. At 310, spine node 120(1) receives a reachability advertisement to destination A from the specific parent node. At 320, spine node 120(1) reinstalls a (previously removed) route to A via the specific parent node. At 330, spine node 120(1) determines whether the specific parent node is the first parent node with a route to destination A. If not, method 300 proceeds to 340. If so, at 350 spine node 120(1) sends reachability advertisements for destination A to all of its children nodes, and then the method proceeds to 340. At 340, spine node 120(1) determines whether all parent nodes now have an installed route to destination A. If so, at 360 spine node 120(1) removes any routes that are redundant with any previously installed routes (e.g., a default route obtained from default routing information). Otherwise, at 370, method 300 is done.

Figure 4A:
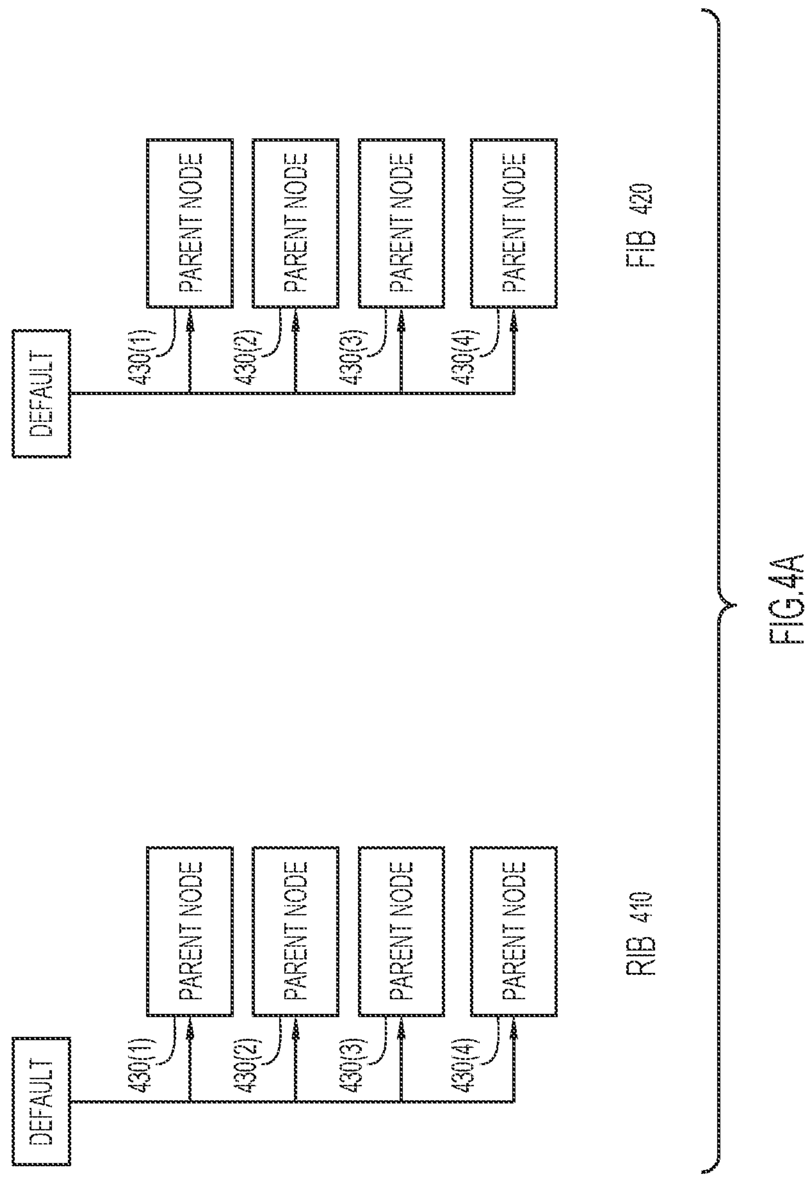
FIGS. 4A-4F illustrate a Routing Information Base (RIB) and a Forwarding Information Base (FIB), according to an example embodiment.
Figure 4B:
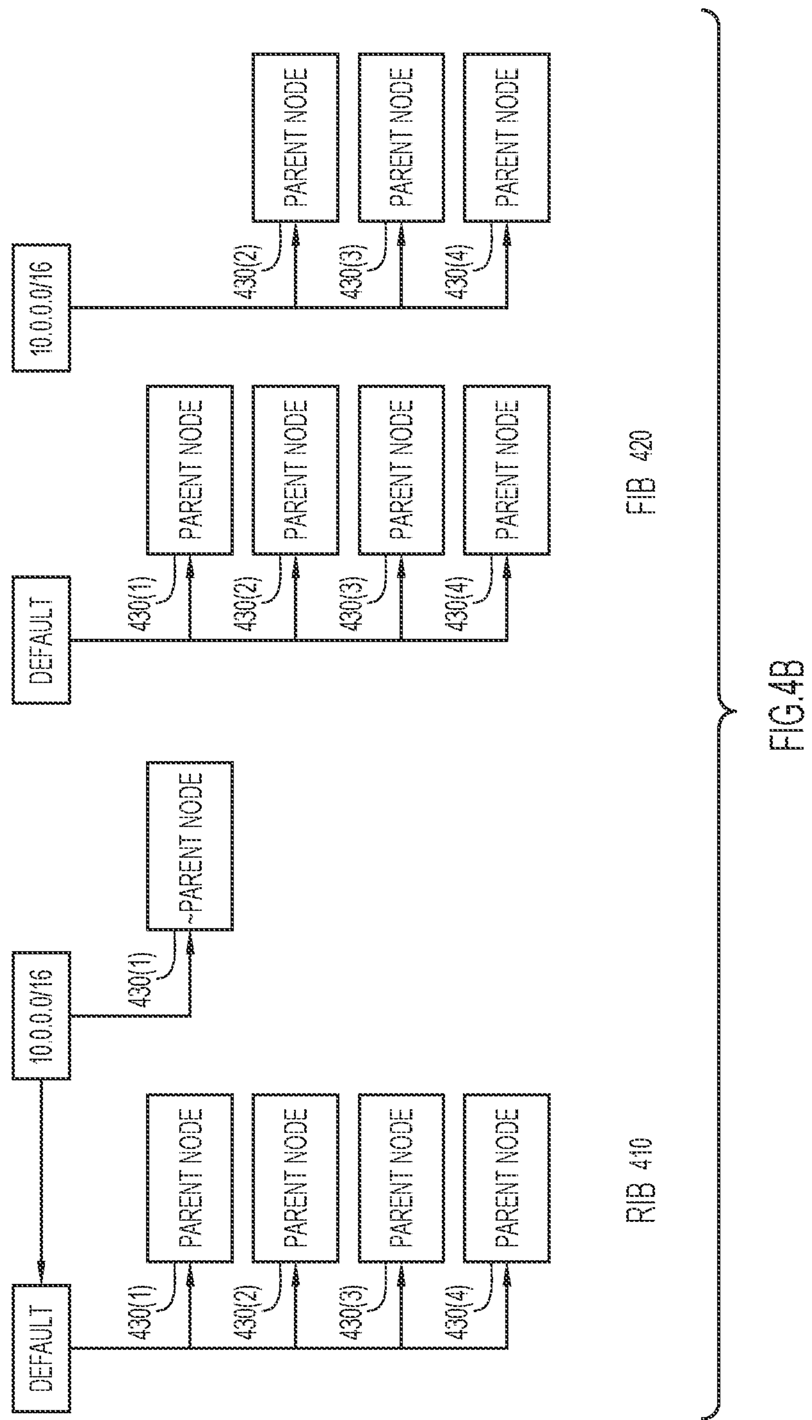

FIGS. 4A-4F illustrate an example Routing Information Base (RIB) 410 and an example Forwarding Information Base (FIB) 420. RIB 410 and FIB 420 may comprise a routing table. As illustrated in FIG. 4A, initially, a network node can reach each of its parent nodes 430(1)-430(4) as indicated by the default routes. As illustrated in FIG. 4B, the network node receives a negative disaggregation advertisement indicating that a destination having the address 10.0.0.0/16 is unreachable via parent node 430(1). The negative disaggregation advertisement is represented in RIB 410 as "~ parent node". The routes are arranged in RIB 410 as a tree hierarchy where the default routes are the parent routes and the routes for 10.0.0.0/16 are children routes. As further illustrated in FIG. 4B, the network node also installs matching routes in FIB 420. In particular, FIB 420 includes routes to 10.0.0.0/16 via parent nodes 430(2)-430(4), but not via parent node 430(1).

Figure 4C:
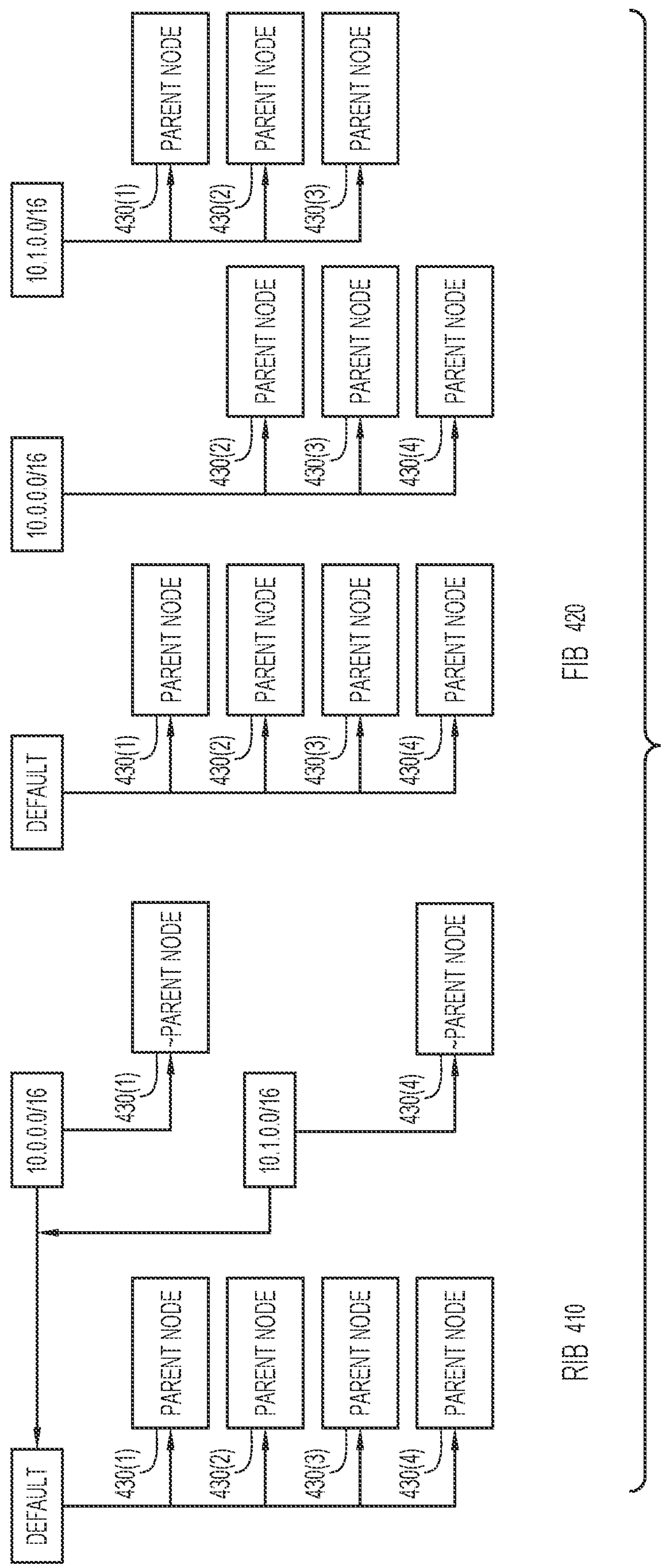

As illustrated in FIG. 4C, the network node receives a second negative disaggregation advertisement indicating that a destination having the address 10.1.0.0/16 is unreachable via parent node 430(4). The negative disaggregation advertisement is represented in RIB 410 as "~ parent node". The routes for 10.1.0.0/16 are children routes of the default routes and siblings of the routes for 10.0.0.0/16. As further illustrated in FIG. 4C, the network node also installs matching routes in FIB 420. In particular, FIB 420 includes routes to 10.1.0.0/16 via parent nodes 430(1)-430(3), but not via parent node 430(4).

Figure 4D:
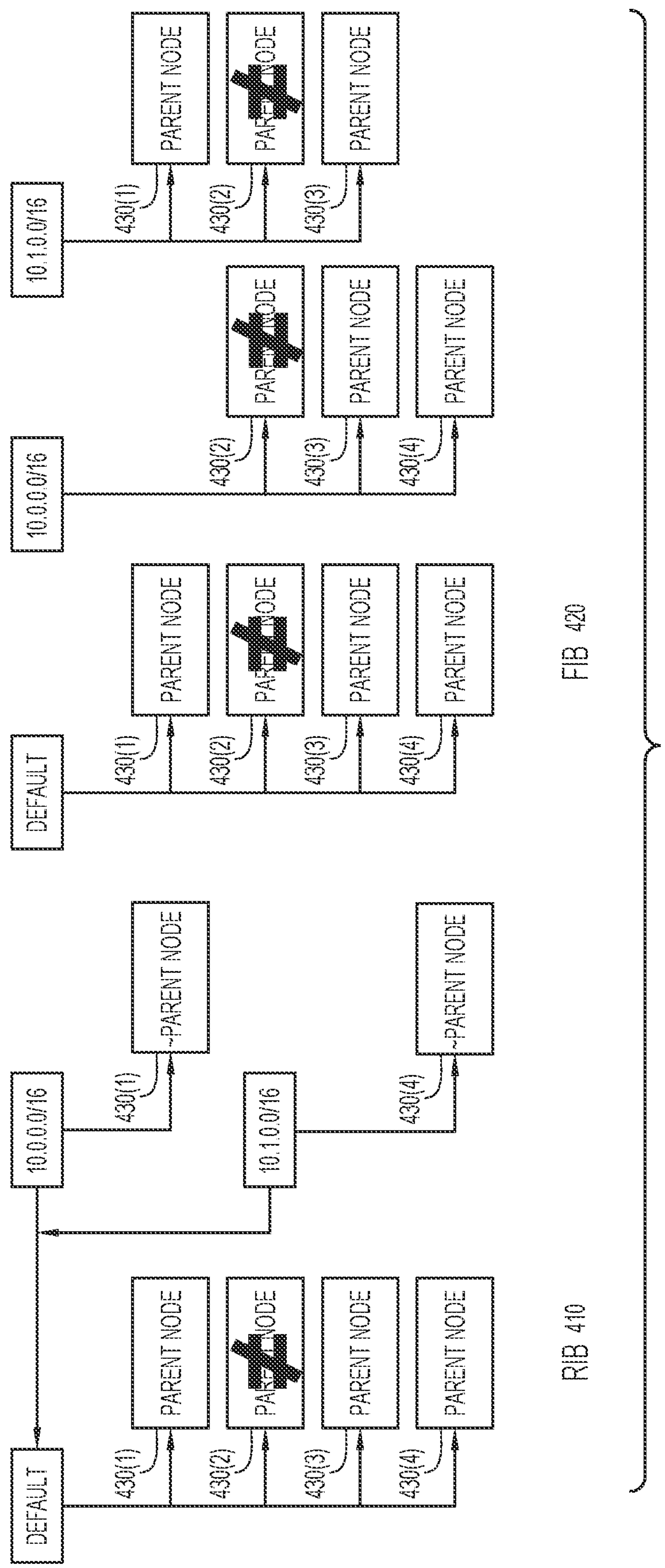

FIG. 4D illustrates recursive negative propagation of a positive disaggregation from the default routes. In this example, a link between the network node and parent node 430(2) goes down and, as such, the network node can no longer reach parent node 430(2). Because the routes for 10.0.0.0/16 and 10.1.0.0/16 are children routes of the default routes, the network node automatically propagates this information to the routes for 10.0.0.0/16 and 10.1.0.0/16. In particular, as shown in FIB 420, the routes for 10.0.0.0/16 and 10.1.0.0/16 via parent node 430(2) are removed. Thus, the network node may now reach 10.0.0.0/16 via parent nodes 430(3) or 430(4) (but not parent nodes 430(1) or 430(2)), and may reach 10.1.0.0/16 via parent nodes 430(1) or 430(3) (but not via parent nodes 430(2) or 430(4)).

Figure 4E:
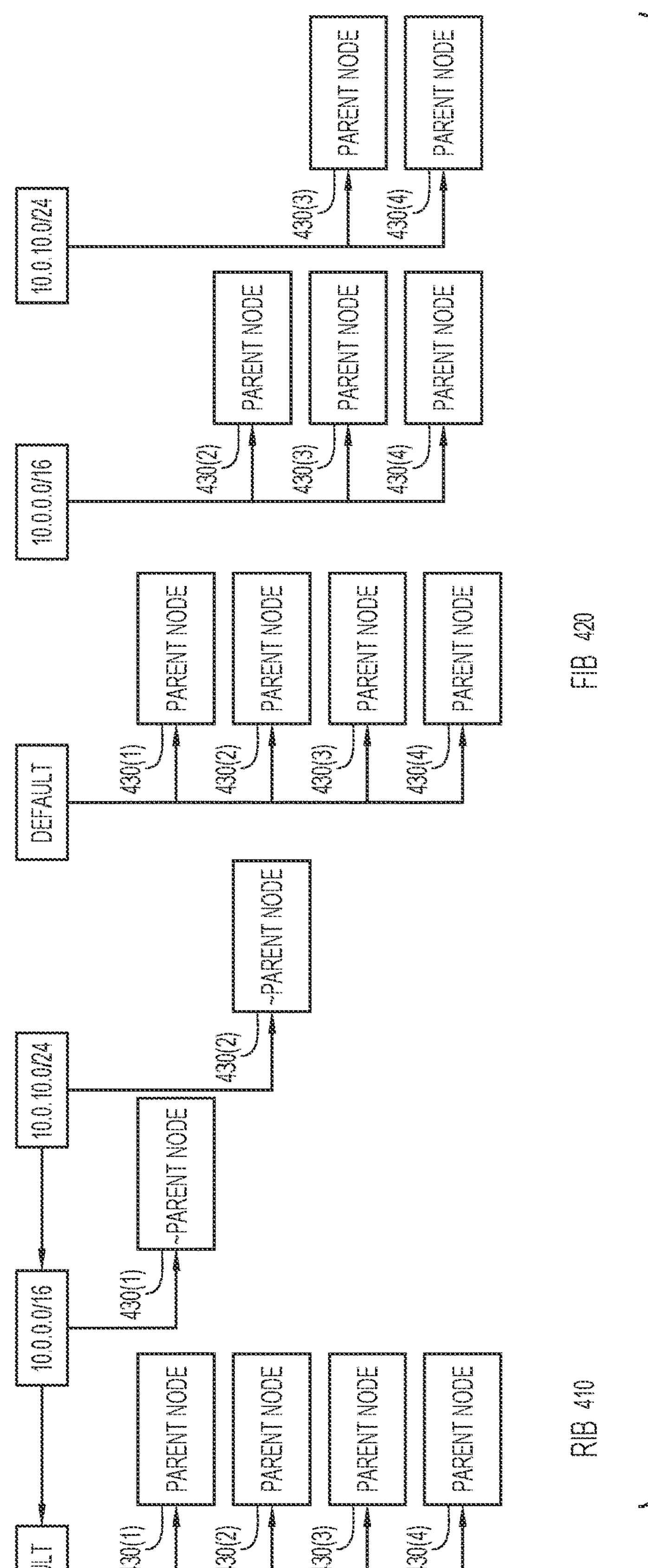

As illustrated in FIG. 4E, the network node receives another negative disaggregation advertisement indicating that a destination having the address 10.0.10.0/24 is unreachable via parent node 430(2). The negative disaggregation advertisement is represented in RIB 410 as "~ parent node". The routes for 10.0.10.0/24 are children routes of the routes for 10.0.0.0/16, which are in turn children routes of the default routes. As further illustrated in FIG. 4E, the network node also installs matching routes in FIB 420. In particular, FIB 420 includes routes to 10.0.10.0/24 via parent nodes 430(3) and 430(4), but not via parent nodes 430(1) or 430(2). FIB 420 does not include a route to 10.0.10.0/24 via parent node 430(1) because 10.0.0.0/16 is also not reachable via parent node 430(1).

Figure 4F:
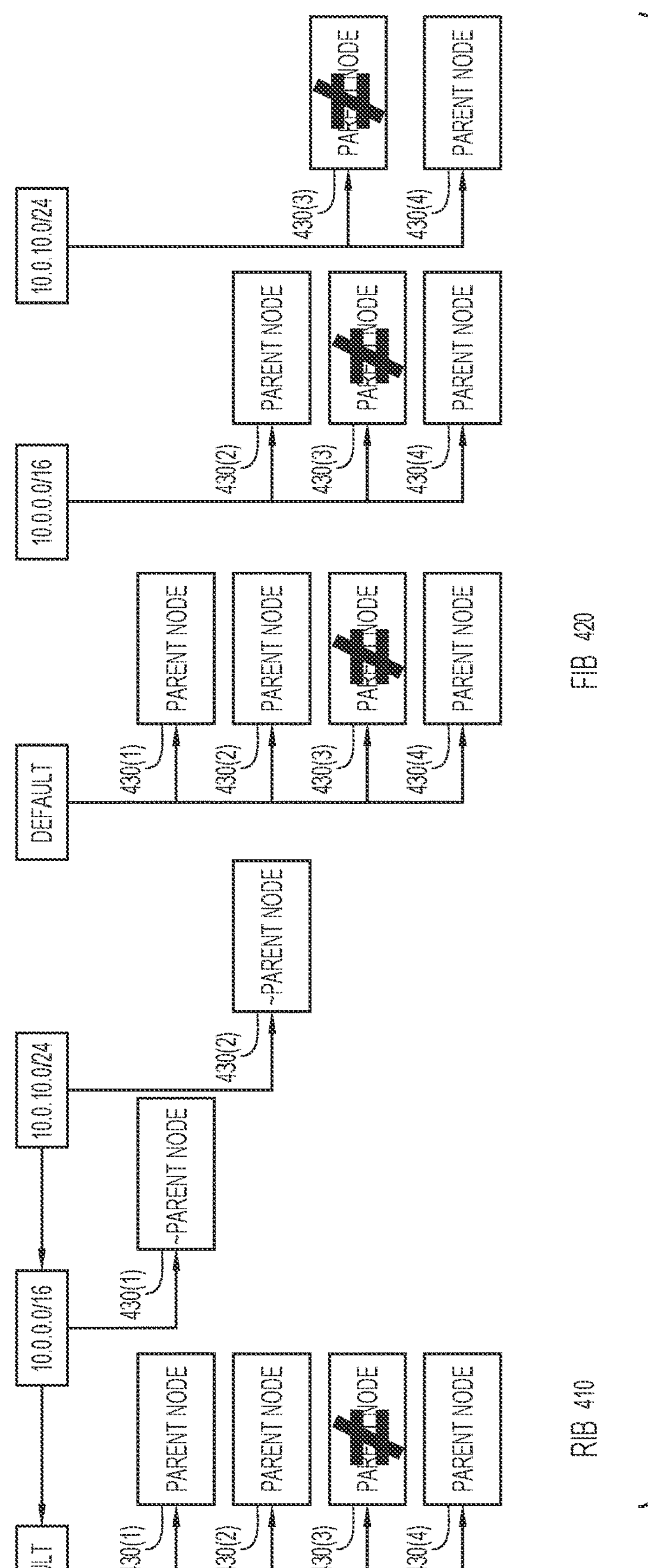

FIG. 4F illustrates recursive negative propagation of a positive disaggregation from the default routes. In this example, a link between the network node and parent node 430(3) goes down and, as such, the network node can no longer reach parent node 430(3). Because the routes for 10.0.0.0/16 are children routes of the default routes, the network node automatically propagates this information to the routes for 10.0.0.0/16. Furthermore, because the routes for 10.0.10.0/24 are children routes of the default routes, the network node automatically propagates this information to the routes for 10.0.10.0/24. Thus, the network node may now reach 10.0.0.0/16 via parent nodes 430(2) or 430(4)

(but not via parent nodes 430(1) or 430(3)), and may reach 10.0.10.0/24 via parent node 430(4) (but not parent nodes 430(1)-430(3)).

Thus, next hop adjacencies may be inherited from a longer prefix to a shorter negative prefix. A network node may remove adjacencies to network nodes that sent advertisements for the negative prefix. Inheritance may occur when a next hop list is modified (e.g., when a next hop or prefix is added or removed). In one example, a "nested" arrangement in the tree hierarchy may lead to multiple (e.g., a series of) inheritances.

Figure 5:
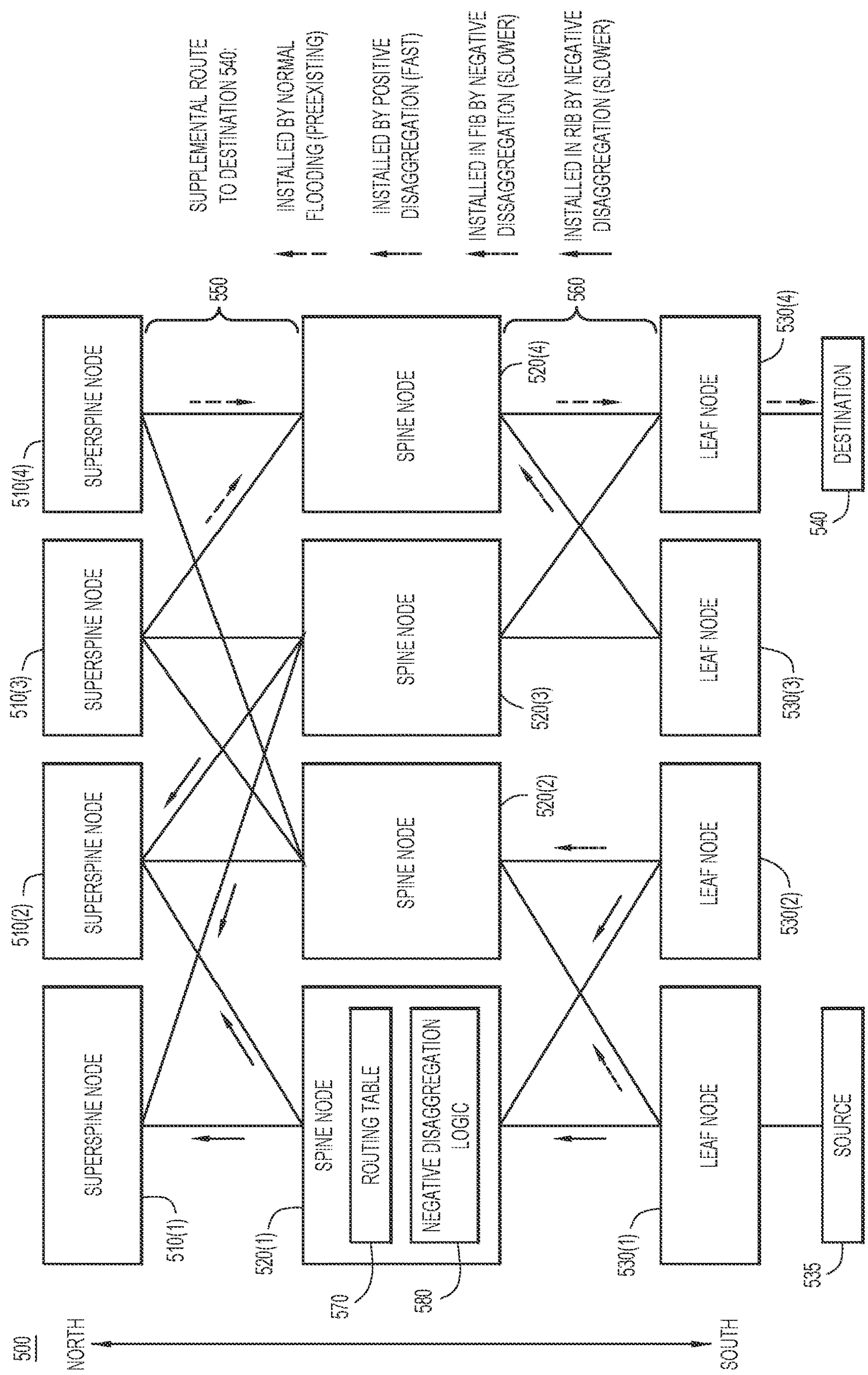
FIG. 5 illustrates a fat tree network configured to route packets using negative disaggregation advertisements, according to another example embodiment.

FIG. 5 illustrates fat tree network 500 configured to route packets using negative disaggregation advertisements as described in connection with FIGS. 4A-4F. Fat tree network 500 includes superspine nodes 510(1)-510(4), spine nodes 520(1)-520(4), leaf nodes 530(1)-530(4), source (e.g., server) 535, and destination (e.g., prefix) 540. Links 550 connect certain superspine nodes 510(1)-510(4) to certain spine nodes 520(1)-520(4). Links 560 connect each of spine nodes 520(1) and 520(2) to each of leaf nodes 530(1) and 530(2), and each of spine nodes 520(3) and 520(4) to each of leaf nodes 530(3) and 530(4). Links 550 may support higher bandwidths than links 560. In one example, source 535 is configured to send one or more network packets to one or more destinations (e.g., destination 540) via fat tree network 500.

Spine node 520(1) includes routing table 570, which in turn includes a RIB and a FIB, and negative disaggregation logic 580. For ease of illustration, only routing table 570 and negative disaggregation logic 580 are shown in spine node 520(1). However, it will be appreciated that each node in fat tree network 500 may include a respective local routing table and respective negative disaggregation logic. Moreover, the negative disaggregation logic may be identical or modified depending on the given node on which the negative disaggregation logic is stored. For example, the negative disaggregation logic stored on two spine nodes may be identical, but the negative disaggregation logic stored on a spine node and a superspine node may differ.

In this example, the link between spine node 520(3) and leaf node 530(4) may be down. Default routing information applies to all north parent nodes. Here, a supplemental route is installed on leaf node 530(4) via spine node 520(4) so as to avoid spine node 520(3). Supplemental routes are also installed on leaf nodes 530(1) and 530(2) so as to avoid spine node 520(1). This prevents network packets destined for destination 540 from being black holed at spine node 520(1) or 520(4). It will be appreciated that the specific implementation of any given RIB and FIB (e.g., how routes are arranged within a tree hierarchy) will depend on the particular topology of the network.

Figure 6:
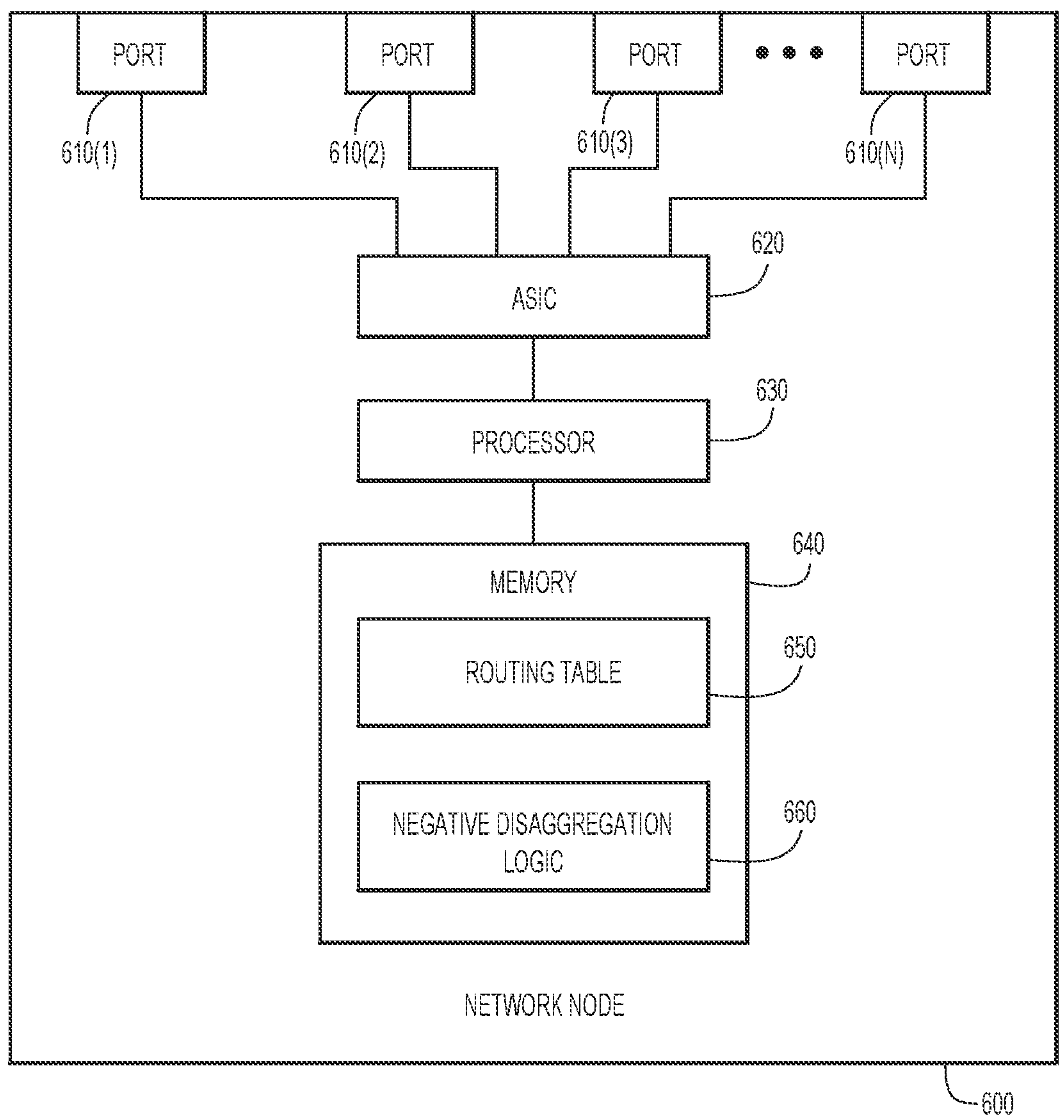
FIG. 6 illustrates a block diagram of a network node configured to perform routing operations in a fat tree network using negative disaggregation advertisements, according to an example embodiment.

FIG. 6 illustrates a block diagram of a network node 600 configured to implement techniques described herein (e.g., spine node 120(1)). The network node includes a network interface in the form of a plurality of network ports 610(1)-610(N) that enable communications over a network, Application Specific Integrated Circuit (ASIC) 620 that performs network processing functions, one or more processors 630 (e.g., microprocessors or microcontrollers), and memory 640. Memory 640 includes routing table 650 (e.g., routing table 170) and instructions for negative disaggregation logic 660 (e.g., negative disaggregation logic 180).

Memory 640 may include read only memory (ROM), random access memory (RAM), magnetic disk storage media devices, optical storage media devices, flash memory devices, electrical, optical, or other physical/tangible memory storage devices. Thus, in general, memory 640 may comprise one or more tangible (non-transitory) computer readable storage media (e.g., a memory device) encoded with software comprising computer executable instructions and when the software is executed (e.g., by one or more processors 630) it is operable to perform operations described herein. In particular, as noted, memory 640 includes negative disaggregation logic 660 that, when executed, enables the network node to perform operations described herein.

Figure 7:
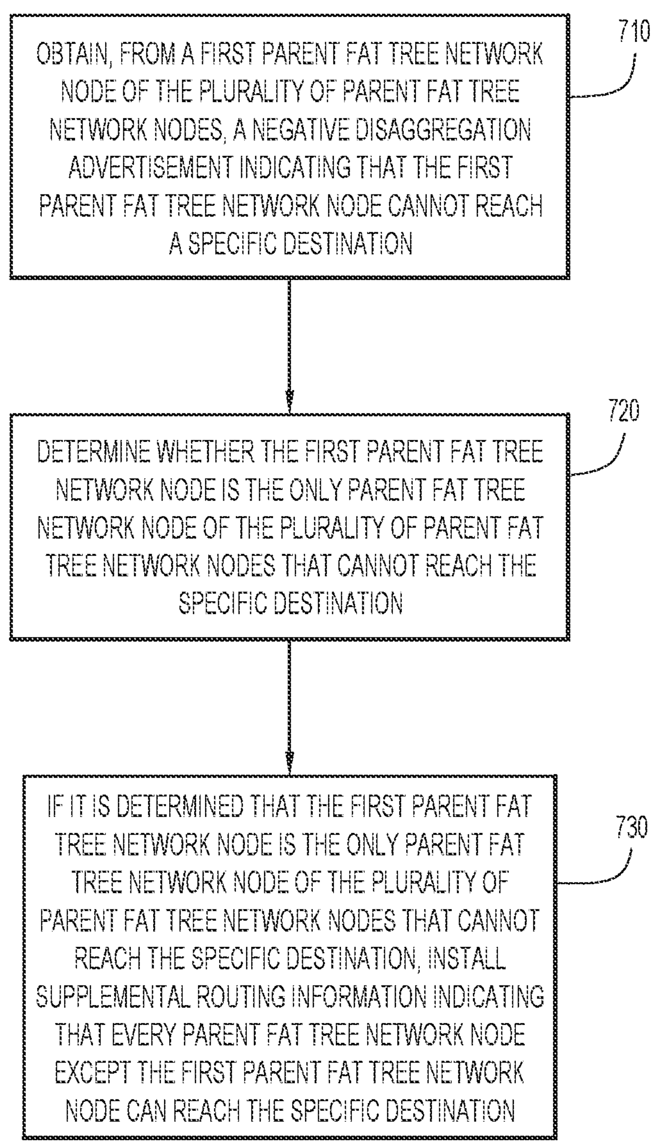
FIG. 7 illustrates a flowchart of a method for routing in a fat tree network using negative disaggregation advertisements, according to an example embodiment.

FIG. 7 illustrates a flowchart of a method 700 for routing in a fat tree network using negative disaggregation advertisements. Method 700 may be performed at a particular fat tree network node (e.g., spine node 120(1)) that stores default routing information indicating that the particular fat tree network node can reach a plurality of parent fat tree network nodes of the particular fat tree network node. At 710, the particular fat tree network node obtains, from a first parent fat tree network node of the plurality of parent fat tree network nodes, a negative disaggregation advertisement indicating that the first parent fat tree network node cannot reach a specific destination.

At 720, the particular fat tree network node determines whether the first parent fat tree network node is the only parent fat tree network node of the plurality of parent fat tree network nodes that cannot reach the specific destination. At 730, if it is determined that the first parent fat tree network node is the only parent fat tree network node of the plurality of parent fat tree network nodes that cannot reach the specific destination, the particular fat tree network node installs supplemental routing information indicating that every parent fat tree network node except the first parent fat tree network node can reach the specific destination.

In one form, a method is provided. The method comprises: at a particular fat tree network node that stores default routing information indicating that the particular fat tree network node can reach a plurality of parent fat tree network nodes of the particular fat tree network node: obtaining, from a first parent fat tree network node of the plurality of parent fat tree network nodes, a negative disaggregation advertisement indicating that the first parent fat tree network node cannot reach a specific destination; determining whether the first parent fat tree network node is the only parent fat tree network node of the plurality of parent fat tree network nodes that cannot reach the specific destination; and if it is determined that the first parent fat tree network node is the only parent fat tree network node of the plurality of parent fat tree network nodes that cannot reach the specific destination, installing supplemental routing information indicating that every parent fat tree network node except the first parent fat tree network node can reach the specific destination. In a one example, the method further comprises: at the particular fat tree network node: obtaining a network packet destined for the specific destination; and routing the network packet to the specific destination based on the supplemental routing information.

In another example, the method further comprises: at the particular fat tree network node: if it is determined that the first parent fat tree network node is not the only parent fat tree network node of the plurality of parent fat tree network nodes that cannot reach the specific destination: locating previously installed supplemental routing information indicating that the first parent fat tree network node can reach the specific destination; and removing the previously installed supplemental routing information indicating that the first parent fat tree network node can reach the specific destination. In a supplemental example, the method further comprises: at the particular fat tree network node: if it is determined that the first parent fat tree network node is not the only parent fat tree network node of the plurality of parent fat tree network nodes that cannot reach the specific destination: determining that none of the plurality of parent fat tree network nodes can reach the specific destination; and in response to determining that none of the plurality of parent fat tree network nodes can reach the specific destination, providing, to at least one child fat tree network node of the particular fat tree network node, a negative disaggregation advertisement indicating that the particular fat tree network node cannot reach the specific destination.

In yet another example, the method further comprises: at the particular fat tree network node: obtaining, from the first parent fat tree network node, a reachability advertisement indicating that the first parent fat tree network node can reach the specific destination; and installing supplemental routing information indicating that the first parent fat tree network node can reach the specific destination. In a supplemental example, the method further comprises: at the particular fat tree network node: determining whether the first parent fat tree network node is the only parent fat tree network node of the plurality of parent fat tree network nodes that can reach the specific destination; and if it is determined that the first parent fat tree network node is the only parent fat tree network node of the plurality of parent fat tree network nodes that can reach the specific destination, providing, to at least one child fat tree network node of the particular fat tree network node, a reachability advertisement indicating that the particular fat tree network node can reach the specific destination. In a further supplemental example, the method further comprises: at the particular fat tree network node: if it is determined that the first parent fat tree network node is not the only parent fat tree network node of the plurality of parent fat tree network nodes that can reach the specific destination: determining that each of the plurality of parent fat tree network nodes can reach the specific destination; and removing the supplemental routing information indicating that every parent fat tree network node except the first parent fat tree network node can reach the specific destination and the supplemental routing information indicating that the first parent fat tree network node can reach the specific destination.

In another form, an apparatus is provided. The apparatus comprises: a memory that stores default routing information indicating that the apparatus can reach a plurality of parent fat tree network nodes of the apparatus; and one or more processors coupled to the memory, wherein the one or more processors are configured to: obtain, from a first parent fat tree network node of the plurality of parent fat tree network nodes, a negative disaggregation advertisement indicating that the first parent fat tree network node cannot reach a specific destination; determine whether the first parent fat tree network node is the only parent fat tree network node of the plurality of parent fat tree network nodes that cannot reach the specific destination; and if it is determined that the first parent fat tree network node is the only parent fat tree network node of the plurality of parent fat tree network nodes that cannot reach the specific destination, install supplemental routing information indicating that every parent fat tree network node except the first parent fat tree network node can reach the specific destination.

In another form, one or more non-transitory computer readable storage media are provided. The non-transitory computer readable storage media are encoded with instructions that, when executed by a processor of a particular fat tree network node that stores default routing information indicating that the particular fat tree network node can reach a plurality of parent fat tree network nodes of the particular fat tree network node, cause the processor to: obtain, from a first parent fat tree network node of the plurality of parent fat tree network nodes, a negative disaggregation advertisement indicating that the first parent fat tree network node cannot reach a specific destination; determine whether the first parent fat tree network node is the only parent fat tree network node of the plurality of parent fat tree network nodes that cannot reach the specific destination; and if it is determined that the first parent fat tree network node is the only parent fat tree network node of the plurality of parent fat tree network nodes that cannot reach the specific destination, install supplemental routing information indicating that every parent fat tree network node except the first parent fat tree network node can reach the specific destination.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

obtaining a negative disaggregation advertisement indicating that a first parent tree network node cannot reach a specific destination;

determining that the first parent tree network node is an only parent tree network node of a plurality of parent tree network nodes that cannot reach the specific destination; and in response to determining that the first parent tree network node is the only parent tree network node of the plurality of parent tree network nodes that cannot reach the specific destination, installing supplemental routing information indicating that every parent tree network node except the first parent tree network node can reach the specific destination.

2. The method of claim 1, further comprising:

determining that the first parent tree network node is not the only parent tree network node of the plurality of parent tree network nodes that cannot reach the specific destination;

locating previously installed supplemental routing information indicating that the first parent tree network node can reach the specific destination; and removing the previously installed supplemental routing information indicating that the first parent tree network node can reach the specific destination.

3. The method of claim 2, further comprising:

determining that none of the plurality of parent tree network nodes can reach the specific destination; and in response to determining that none of the plurality of parent tree network nodes can reach the specific destination, providing, to at least one child tree network node, a negative disaggregation advertisement indicating that the specific destination cannot be reached.

4. The method of claim 1, further comprising:

obtaining, from the first parent tree network node, a reachability advertisement indicating that the first parent tree network node can reach the specific destination; and installing supplemental routing information indicating that the first parent tree network node can reach the specific destination.

5. The method of claim 4, further comprising:

determining that the first parent tree network node is the only parent tree network node of the plurality of parent tree network nodes that can reach the specific destination; and in response to determining that the first parent tree network node is the only parent tree network node of the plurality of parent tree network nodes that can reach the specific destination, providing, to at least one child tree network node, a reachability advertisement indicating that the specific destination can be reached.

6. The method of claim 5, further comprising:

determining that the first parent tree network node is not the only parent tree network node of the plurality of parent tree network nodes that can reach the specific destination;

determining that each of the plurality of parent tree network nodes can reach the specific destination; and removing the supplemental routing information indicating that every parent tree network node except the first parent tree network node can reach the specific destination and the supplemental routing information indicating that the first parent tree network node can reach the specific destination.

7. The method of claim 1, further comprising:

obtaining a network packet destined for the specific destination; and routing the network packet to the specific destination based on the supplemental routing information.

8. An apparatus comprising:

a memory; and one or more processors coupled to the memory, wherein the one or more processors are configured to:

obtain a negative disaggregation advertisement indicating that a first parent tree network node cannot reach a specific destination;

determine whether the first parent tree network node is an only parent tree network node of a plurality of parent tree network nodes that cannot reach the specific destination; and if it is determined that the first parent tree network node is the only parent tree network node of the plurality of parent tree network nodes that cannot reach the specific destination, install supplemental routing information indicating that every parent tree network node except the first parent tree network node can reach the specific destination.

9. The apparatus of claim 8, wherein the one or more processors are further configured to:

if it is determined that the first parent tree network node is not the only parent tree network node of the plurality of parent tree network nodes that cannot reach the specific destination:

locate previously installed supplemental routing information indicating that the first parent tree network node can reach the specific destination; and remove the previously installed supplemental routing information indicating that the first parent tree network node can reach the specific destination.

10. The apparatus of claim 9, wherein the one or more processors are further configured to:

if it is determined that the first parent tree network node is not the only parent tree network node of the plurality of parent tree network nodes that cannot reach the specific destination:

determine that none of the plurality of parent tree network nodes can reach the specific destination; and in response to determining that none of the plurality of parent tree network nodes can reach the specific destination, provide, to at least one child tree network node of the apparatus, a negative disaggregation advertisement indicating that the apparatus cannot reach the specific destination.

11. The apparatus of claim 8, wherein the one or more processors are further configured to:

obtain, from the first parent tree network node, a reachability advertisement indicating that the first parent tree network node can reach the specific destination; and install supplemental routing information indicating that the first parent tree network node can reach the specific destination.

12. The apparatus of claim 11, wherein the one or more processors are further configured to:

determine whether the first parent tree network node is the only parent tree network node of the plurality of parent tree network nodes that can reach the specific destination; and if it is determined that the first parent tree network node is the only parent tree network node of the plurality of parent tree network nodes that can reach the specific destination, provide, to at least one child tree network node of the apparatus, a reachability advertisement indicating that the apparatus can reach the specific destination.

13. The apparatus of claim 12, wherein the one or more processors are further configured to:

if it is determined that the first parent tree network node is not the only parent tree network node of the plurality of parent tree network nodes that can reach the specific destination:

determine that each of the plurality of parent tree network nodes can reach the specific destination; and remove the supplemental routing information indicating that every parent tree network node except the first parent tree network node can reach the specific destination and the supplemental routing information indicating that the first parent tree network node can reach the specific destination.

14. The apparatus of claim 8, wherein the one or more processors are further configured to:

obtain a network packet destined for the specific destination; and route the network packet to the specific destination based on the supplemental routing information.

15. One or more non-transitory computer readable storage media encoded with instructions that, when executed by a processor, cause the processor to:

obtain a negative disaggregation advertisement indicating that a first parent tree network node cannot reach a specific destination;

determine whether the first parent tree network node is an only parent tree network node of a plurality of parent tree network nodes that cannot reach the specific destination; and if it is determined that the first parent tree network node is the only parent tree network node of the plurality of parent tree network nodes that cannot reach the specific destination, install supplemental routing information indicating that every parent tree network node except the first parent tree network node can reach the specific destination.

16. The one or more non-transitory computer readable storage media of claim 15, wherein the instructions further cause the processor to:

if it is determined that the first parent tree network node is not the only parent tree network node of the plurality of parent tree network nodes that cannot reach the specific destination:

locate previously installed supplemental routing information indicating that the first parent tree network node can reach the specific destination; and remove the previously installed supplemental routing information indicating that the first parent tree network node can reach the specific destination.

17. The one or more non-transitory computer readable storage media of claim 16, wherein the instructions further cause the processor to:

if it is determined that the first parent tree network node is not the only parent tree network node of the plurality of parent tree network nodes that cannot reach the specific destination:

determine that none of the plurality of parent tree network nodes can reach the specific destination; and in response to determining that none of the plurality of parent tree network nodes can reach the specific destination, provide, to at least one child tree network node, a negative disaggregation advertisement indicating that the specific destination cannot be reached.

18. The one or more non-transitory computer readable storage media of claim 15, wherein the instructions further cause the processor to:

obtain, from the first parent tree network node, a reachability advertisement indicating that the first parent tree network node can reach the specific destination; and install supplemental routing information indicating that the first parent tree network node can reach the specific destination.

19. The one or more non-transitory computer readable storage media of claim 18, wherein the instructions further cause the processor to:

determine whether the first parent tree network node is the only parent tree network node of the plurality of parent tree network nodes that can reach the specific destination; and if it is determined that the first parent tree network node is the only parent tree network node of the plurality of parent tree network nodes that can reach the specific destination, provide, to at least one child tree network node, a reachability advertisement indicating that the specific destination can be reached.

20. The one or more non-transitory computer readable storage media of claim 19, wherein the instructions further cause the processor to:

if it is determined that the first parent tree network node is not the only parent tree network node of the plurality of parent tree network nodes that can reach the specific destination:

determine that each of the plurality of parent tree network nodes can reach the specific destination; and remove the supplemental routing information indicating that every parent tree network node except the first parent tree network node can reach the specific destination and the supplemental routing information indicating that the first parent tree network node can reach the specific destination.

* * * * *